(12) United States Patent
Tang et al.

(10) Patent No.: US 8,239,579 B2
(45) Date of Patent: Aug. 7, 2012

(54) PLL/DLL DUAL LOOP DATA SYNCHRONIZATION

(75) Inventors: Benjamim Tang, Rancho Palos Verdes, CA (US); Scott Southwell, Seal Beach, CA (US); Nicholas Robert Steffen, Redondo Beach, CA (US)

(73) Assignee: Infineon Technologies Austria AG, Villach (AT)

( * ) Notice: Subject to any disclaimer, the term of this patent is extended or adjusted under 35 U.S.C. 154(b) by 0 days.

(21) Appl. No.: 12/719,450

(22) Filed: Mar. 8, 2010

(65) Prior Publication Data

US 2010/0166132 A1    Jul. 1, 2010

Related U.S. Application Data

(63) Continuation of application No. 12/077,002, filed on Mar. 14, 2008, now Pat. No. 7,743,168, which is a continuation of application No. 10/029,956, filed on Dec. 20, 2001, now abandoned.

(60) Provisional application No. 60/257,044, filed on Dec. 20, 2000.

(51) Int. Cl.
   *G06F 15/16* (2006.01)

(52) U.S. Cl. ........ 709/248; 709/242; 709/251; 375/372; 375/373; 375/376

(58) Field of Classification Search .................. 709/248, 709/242, 251; 375/372, 373, 376
See application file for complete search history.

(56) References Cited

U.S. PATENT DOCUMENTS

| 5,214,676 A * | 5/1993 | Wilkinson ................... 375/371 |
| 6,172,946 B1 * | 1/2001 | Furukawa et al. .......... 369/30.16 |
| 7,251,256 B1 * | 7/2007 | Barry et al. .................... 370/503 |
| 2002/0071497 A1 * | 6/2002 | Bengtsson et al. ............ 375/298 |
| 2002/0097743 A1 * | 7/2002 | Baydar et al. ................. 370/463 |
| 2002/0153933 A1 * | 10/2002 | Taguchi et al. ............... 327/292 |

* cited by examiner

*Primary Examiner* — Lan-Dai T Truong
(74) *Attorney, Agent, or Firm* — Murphy, Bilak & Homiller, PLLC

(57) ABSTRACT

A dual loop (PLL/DLL) data synchronization system and method for plesiochronous systems is provided. A dual loop data serializer includes a phase lock loop (PLL) and a delayed lock loop (DLL) configured with a phase shifter in the feedback path of the PLL. The dual loop serializer locks to the input of the DLL instead of the local reference. Thus, the DLL adjusts the frequency from the PLL so that it matches the desired data rate. Each loop may be optimized for jitter tolerance with the net effect generating a synthesized clean clock (due to narrow bandwidth filtering) and VCO noise suppression (due to wide bandwidth filtering). A dual loop retimer includes a dual loop serializer (PLL/DLL) and a clock recovery DLL. The retimer resets the jitter budget to meet transmission requirements for an infinite number of repeater stages.

13 Claims, 7 Drawing Sheets

DUAL LOOP SERIALIZER

CONVENTIONAL SYNCHRONOUS SYSTEM

CONVENTIONAL PLESIOCHRONOUS SYSTEM

CONVENTIONAL PLESIOCHRONOUS SUBSYSTEM

PLL/DLL DUAL LOOP DATA SYNCHRONIZATION

CROSS REFERENCE TO RELATED APPLICATIONS

This application is a continuation of and claims priority from U.S. patent application Ser. No. 10/029,956 filed on Dec. 20, 2001. This application includes subject matter that is related to and also claims priority from U.S. Provisional Patent Application Ser. No. 60/257,044 filed Dec. 20, 2000 and entitled, "Method and Apparatus for Providing PLL and DLL Based Data Synchronization in Plesiochronous Systems." This application further includes subject matter related to U.S. patent application Ser. No. 10/029,709 filed on Dec. 20, 2001, and entitled "PLL/DLL Dual Loop Data Synchronization Utilizing a Granular FIFO Fill Level Indicator," now U.S. Pat. No. 7,366,270.

FIELD OF INVENTION

The present invention relates generally to a system and method for data synchronization and, in particular, to an improved phase locked loop/delayed lock loop (PLL/DLL) "dual loop" approach to data synchronization.

BACKGROUND OF THE INVENTION

Synchronization in data communication is often composed of several levels, with the highest level(s) involving methods like correlation and the lowest levels involving clock and data recovery (CDR). The lowest levels of synchronization occur first and often dictate the quality of synchronization available at the highest levels; thus it is desirable to ensure high quality and efficient data synchronization at the lowest levels.

Clock generation and distribution is a significant challenge in the design of large and complex digital systems. Ordinarily, clock generation and distribution can be well controlled in small systems and subsystems. For instance, synchronous signaling, where the data signal timing is related to a single timing reference (i.e., global reference), can be used for practically all critical high-speed signals. FIG. 1 illustrates a basic conventional topology for a synchronous system.

Synchronous clocking systems, such as the Synchronous Optical Network (SONET), use a single timing model. Originally developed for transmission of telecommunications signals such as voice, SONET is now the prevalent transport infrastructure for the wide area network (WAN) backbone. The primary benefit of the synchronous transmission and multiplexing hierarchy defined by SONET, is that multiple data streams at the defined rates can be combined (multiplexed), without bit stuffing into a higher rate stream, and can be extracted without demultiplexing the entire higher rate stream. Although the SONET method works well and has been in use for large backbone telecom networks, it is an expensive and complex system.

FIG. 2 illustrates a conventional topology for a plesiochronous system, where, unlike the synchronous system, each subsystem is designed to have its own local clock generation and distribution. A plesiochronous system is defined as one where the local clocks operate at approximately the same frequency such that the difference in frequency between any two subsystems is bounded to a small difference. For example, Infiniband™ networks are designed such that the local references are within +/−100 ppm of the ideal timing reference. To accommodate the differences in data periods due to the frequency differences, the conventional plesiochronous system employs bit stuffing techniques, where special bits are either added or deleted to adjust the rate of an incoming data stream to the frequency of the system receiving the data stream. With continued reference to FIG. 2, digital subsystem 1 transmits at a frequency of Fc1. Subsystem 2 has a clock rate of Fc2 which is close to the frequency of Fc1, but not exact. In order for subsystem 2 to use the data at its clock rate of Fc2, frequency compensation must be performed on the Fc1 data stream. Thus, the intra-system interfaces require data transmitted synchronously from one subsystem, to be retimed or synchronized to the local reference in the receiving subsystem.

FIG. 3 illustrates a conventional data synchronization architecture for each subsystem in the plesiochronous system of FIG. 2. As shown, a basic function of the subsystem is to retime the received data and provide a clock (local reference) aligned to that data for further digital processing.

Phase locked loops (PLLs) and delayed locked loops (DLLs) are common systems used in the I/O interfaces of data communication systems. In these applications, the PLL and DLL closely track the input clock and help to improve overall system timing. However, the rising demand for high-speed I/O has created an increasingly noisy environment in which the PLL and DLL must function. Noise tends to cause the output clocks of the PLL and DLL to jitter from their ideal timing. With a shrinking tolerance for jitter in the decreasing period of the output clock, the design of low jitter PLLs and DLLs has become challenging. To reduce PLL jitter, the loop bandwidth should be set as high as possible. Unfortunately, design tradeoffs often constrain the PLL bandwidth to be well below the lowest operating frequency for stability reasons. These constraints can cause the PLL to have a narrow operating frequency range and poor jitter performance. Although a typical DLL is based on a delay line and, thus is simpler from a control perspective, it can have a limited delay range which leads to a set of problems similar to that of the PLL.

One attempt at improving clock and data recovery in a plesiochronous system is illustrated in FIG. 4. A clock-data recovery (CDR) 400 includes a dual loop configuration having a PLL 402 and a DLL 406. PLL 402 is configured in a conventional manner having a phase frequency detector (PFD) 403, a loop filter 412, and a voltage controlled oscillator (VCO) 414. A local reference is detected at PFD 403 and filtered through loop filter 412. Typically, loop filter 412 is configured as a wideband loop for suppressing the VCO phase noise below the loop bandwidth. VCO 414 is configured to generate an oscillating signal at a frequency proportional to the local reference by using a frequency divider (not shown) at the input of PFD 403.

DLL 406 includes a phase detector 407, which receives the incoming data, a digital loop filter 408, and a phase shifter 409. Digital loop filter 408 may be configured as a wideband loop to track input jitter. Phase shifter 409 may be, for example, an infinite range phase shifter, typically implemented as a multi-phase selector, and provides an input to decision circuit 410. Phase shifter 409 provides a variable phase shift of the phase shifter input such that a clock may be generated having phase and frequency components that can be varied relative to the VCO output. Decision circuit 410 receives the output of phase shifter 409 and provides an output consisting of retimed data. Generally, decision circuit 410 includes a high speed comparator or D-flip-flop that allows detection of small amplitude signals and regenerates the signals to normal amplitude by reclocking the input.

While this dual loop configuration may offer some advantages over the single loop systems, for example, individual loop optimization, the DLL bandwidth must be very wide to accommodate the input jitter. In CDR systems, it is often desirable to have a wide bandwidth; however, in other applications, this is not always the case. For example, a wide bandwidth CDR is not desirable if the output clock jitter must be kept low. The output clock jitter's relationship to the input clock jitter is the jitter transfer function. A low bandwidth jitter transfer function typically allows a lower clock jitter to be generated. This is because the high frequency jitter is reduced by the lowpass filtering properties of the jitter transfer function.

If several retiming operations occur in the CDR system, it is possible for a substantial amount of jitter to be introduced if the jitter transfer function of the retimer is such that the output jitter exceeds the input jitter. This typically occurs in a PLL based CDR due to peaking in the jitter transfer function caused by the second order nature of the system, i.e., two integrators; one in the PLL loop filter and one in the VCO. DLL based CDRs, such as CDR 400, generally exhibit little or no jitter peaking because they are first order systems. However, CDR 400 sustains a performance tradeoff in selection of the loop bandwidth, i.e., optimizing the jitter tolerance versus optimizing the jitter transfer.

Accordingly, an improved system and method for data synchronization in a plesiochronous system is needed. Specifically, a system and method for improved data serialization and retiming having minimum jitter generation (e.g., wide loop bandwidth) and maximum jitter suppression (e.g., narrow loop bandwidth) is desired. In addition, a plesiochronous system and method for data recovery and retiming is needed which does not require bit stuffing.

SUMMARY OF THE INVENTION

An improved system and method for data synchronization is herein provided and, in particular, a dual loop system and method for data synchronization. In exemplary embodiments, a system and method includes a dual loop data serializer having a phase lock loop (PLL) and a delayed lock loop (DLL). Each loop has a loop filter configured to optimize performance of the serializer. The PLL including a phase shifter configured in the PLL feedback path.

In other exemplary embodiments, a system and method includes a dual loop data retimer having a dual loop serializer and a digital delay lock loop (DDLL). The serializer having-a PLL and a DLL with a configurable loop filter in each loop. The DDLL receiving input data and configured to recover a clock from the data.

BRIEF DESCRIPTION OF THE DRAWINGS

These and other features, aspects and advantages of the present invention will become better understood with reference to the following description, appending claims, and accompanying drawings where:

DETAILED DESCRIPTION

The present invention may be described herein in terms of various functional components and various processing steps. It should be appreciated that such functional components may be realized by any number of hardware or structural components configured to perform the specified functions. For example, the present invention may employ various other components and modules, such as buffers, filters, converters, and logic devices under the control of one or more microprocessors or other microcontrollers. In addition, the present invention may be practiced in any data communication context. However for purposes of illustration only, exemplary embodiments of the present invention will be described herein in connection with a data synchronization system. Further, it should be noted that while various components may be suitably coupled or connected to other components within exemplary circuits, such connections and couplings can be realized by direct connection between components, or by connection through other components and devices located thereinbetween.

A PLL/DLL dual loop data synchronization system and method is provided. Used herein, "dual loop" refers to a combined phase locked loop (PLL) and delay lock loop (DLL) synchronization system. As will be discussed in the following paragraphs, this improved technique for data synchronization in a plesiochronous environment allows functions such as clock recovery, serialization, and retiming to be carried out with improved performance over traditional methods.

Figure 5:
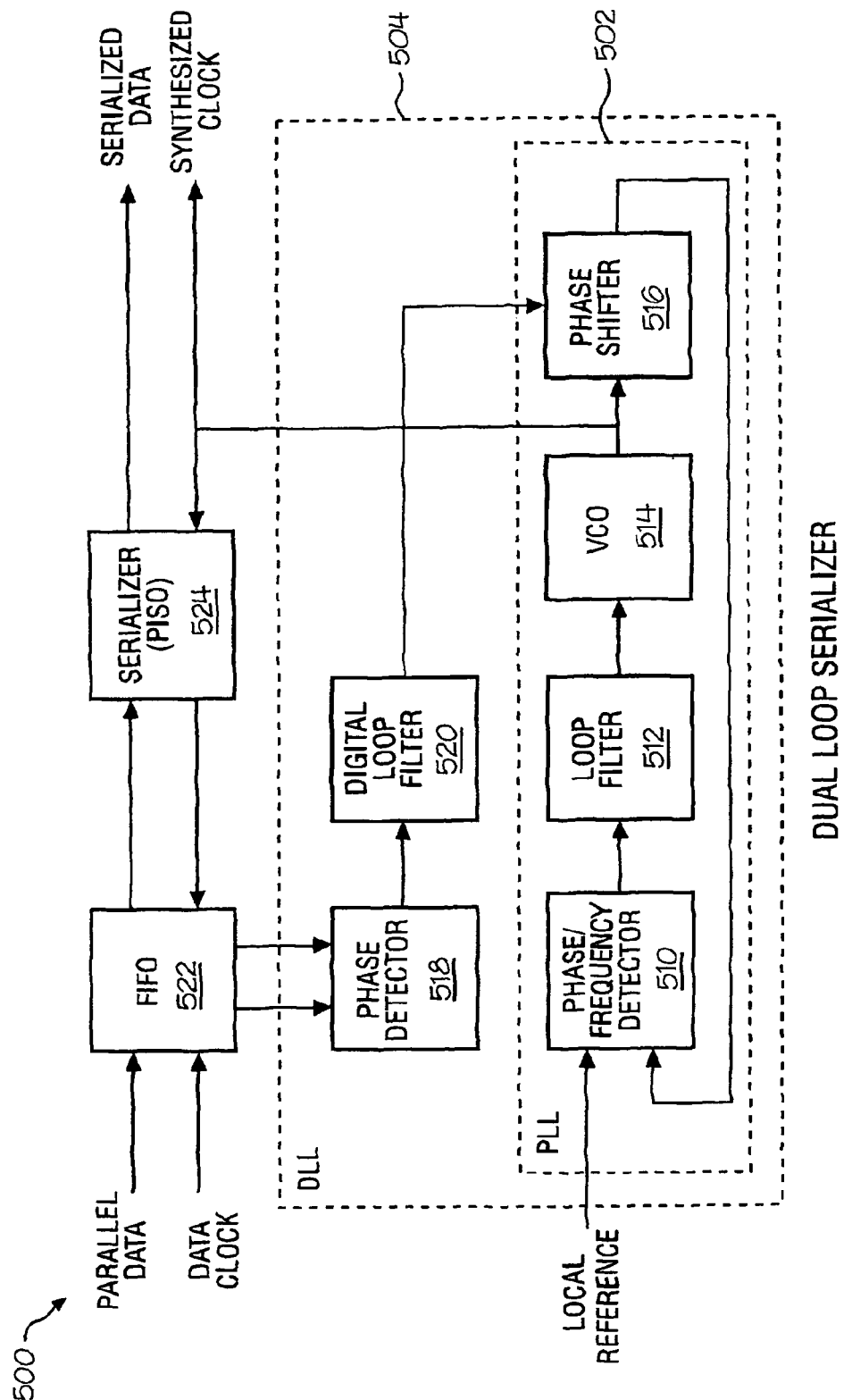
FIG. 5 illustrates, in block format, a dual loop serializer in accordance with one embodiment of the invention.

FIG. 5 illustrates an exemplary dual loop data serializer system 500 in accordance with one embodiment of the invention. Serializer system 500 is particularly suited for implementation in a plesiochronous system where each subsystem includes a local reference. In general, serializer system 500 receives a parallel data byte input, converts the data byte into a stream of serial data bits and transmits the serialized data (frequently to a deserializer). The serial data typically includes clock information, which if extracted, can be used to recover the serial data stream and reassemble the parallel byte.

Serializer system 500 includes a PLL 502 and a DLL 504 in a dual loop configuration. In one particular embodiment, DLL 504 is embedded within PLL 502; however, in other embodiments, the DLL and PLL may be separated. PLL 502 includes a phase frequency detector (PFD) 510, a loop filter 512, a VCO 514, and a phase shifter 516. DLL 504 also includes a phase detector 518 and a digital loop filter 520. In addition, serializer system 500 includes a FIFO buffer 522 (first-in first-out) and a PISO (parallel-in serial-out) serializer 524.

While phase frequency detector 510, loop filter 512 and VCO 514 can function similar to a traditional clock multiplier typically used in serializers, in the exemplary embodiment, PLL 502 includes phase shifter 516 configured in the feedback path of PLL 502. Thus, unlike a conventional data recovery system, which locks to the local reference, PLL 502 can suitably lock to the input clock of FIFO 522 that feeds phase detector 518 of DLL 504. In other words, while a conventional PLL is designed to lock to the local reference, PLL 502 is able to lock to the input of DLL phase detector 518 by placing phase shifter 516 in the feedback path of PLL 502. In addition, phase shifter 516 allows PLL 502 to accommodate small frequency offsets in the reference clock relative to the parallel data rate.

The frequency from PLL 502 can be adjusted to match the desired data rate. In this manner, the data into FIFO 522 contains a jittery clock, i.e., the clock is not stable due to the noise. A clean clock with jitter filtered out is thus desirable. Using the dual loop approach of the exemplary embodiment, a clean clock can be generated without jeopardizing the performance of the system by incorporating dual bandwidths. For instance, loop filter 512 of PLL 502 may include a relatively wide bandwidth to suppress VCO phase noise and generate the low jitter clock. On the other hand, loop filter 520 of DLL 504 may include a narrow bandwidth to filter the noise from the data clock that is being read into FIFO 522. The net effect is to generate a synthesized clock that is very clean because it has been filtered from the data clock at a low bandwidth by filter 520, yet still suppresses the VCO noise due to the wide bandwidth of filter 512.

Phase detector 518 in DLL 504 monitors FIFO 522 fill level (write minus read) and adjusts the output phase so that the transmit clock maintains a constant FIFO fill rate. In one particular embodiment, phase detector 518 may include a granular FIFO fill level indicator. Suitable examples of a granular FIFO fill level indicator are disclosed in U.S. patent application Ser. No. 10/029,709 entitled "PLUDLL Dual Loop Synchronization Utilizing a Granular FIFO Fill Level Indicator." The aforementioned application being filed on even date as the present disclosure and having a common assignee and inventorship; the contents of which are incorporated herein by reference.

The parallel data is registered with its own reference clock (data clock) and FIFO 522 is used to provide a larger timing window for data serializer 524. Serializer 524 may be, for example, a parallel-in serial-out (PISO) data multiplexer operating at the synthesized transmit clock.

In operation, serializer system 500 receives a local reference (such as a local clock in a plesiochronous system) at PFD 510. Loop filter 512, being coupled to PFD 510 and VCO 514, may comprise any suitable components to preferably provide a wide bandwidth filter. In this manner, loop filter 512 is configured to suppress phase noise from VCO 514. Phase shifter 516 receives the local reference from VCO 514 and also receives a signal from digital loop filter 520 of DLL 504. Configured in a feedback loop of PLL 502, phase shifter 516 provides a variable phase shift relative to the VCO output to PFD 510. The outputs of PFD are integrated by loop filter 512 which provide a control voltage that modifies the output frequency of VCO 514. In this manner, the control loop adjusts the phase and frequency of VCO 514 such that the two inputs to PFD 510 maintain a fixed relative phase. Parallel data and a data clock are received at FIFO 522. A signal representative of the fill rate of FIFO 522 is received at phase detector 518 of DLL 504. Phase detector 518 translates the FIFO fill level into a value that is integrated by loop filter 520 to produce a phase shift in PLL 502. Thus an offset in the FIFO fill level corresponds to a frequency offset in the PLL relative to the local reference clock. In this manner, DLL 504 can modify the phase and frequency of VCO 514 so that the FIFO fill level is nearly constant. Further, VCO 514 output is phase-locked to FIFO 522 data clock with a narrowband loop set by DLL 504 bandwidth; thus, providing a low bandwidth jitter transfer function with little or no peaking. Outside of the bandwidth of DLL 504, VCO 514 output may be phase locked to the PLL frequency reference; thus, providing wideband suppression of VCO 514 phase noise. Accordingly, a synthesized low jitter clock is output.

This dual loop, dual bandwidth approach of the invention allows individual optimization of the PLL and DLL loop characteristics to improve overall system performance. For instance, jitter in the data rate is rejected since the DLL loop bandwidth can be set arbitrarily low without impacting the PLL jitter generation. Moreover, serializer 500 offers significant advantages over a traditional serializer. For instance, a conventional serializer requires the data rate and the reference clock to be phase locked, which limits its usefulness in a plesiochronous system. If a clean reference is not available, then the "dirty" data clock must be used, resulting in a noisier output clock. Using the techniques disclosed herein, a clean reference is available since the reference matches the input data rate to within a small frequency offset.

In addition to performance advantages, the dual loop approach of serializer system 500 offers substantial architectural flexibility. The DLL lends itself well to a fully digital element. This facilitates the implementation by reducing the number of analog components. As is widely recognized in the industry, analog loops can be highly sensitive causing the jitter transfer function to deviate if the component values change. In present serializer system 500, the DLL may be built around a purely digital element so the digital loop filter sets the jitter transfer bandwidth and the transfer function will be the same from system to system. Additionally, the transmit rate is set by the data rate. Therefore, frequency compensation, such as bit stuffing, is not required in this plesiochronous system. Moreover, the present system can accommodate asynchronous data transfer, where the parallel data is written in bursts as long as the FIFO depth and fill rates are consistent with the maximum phase update rate.

Figure 6:
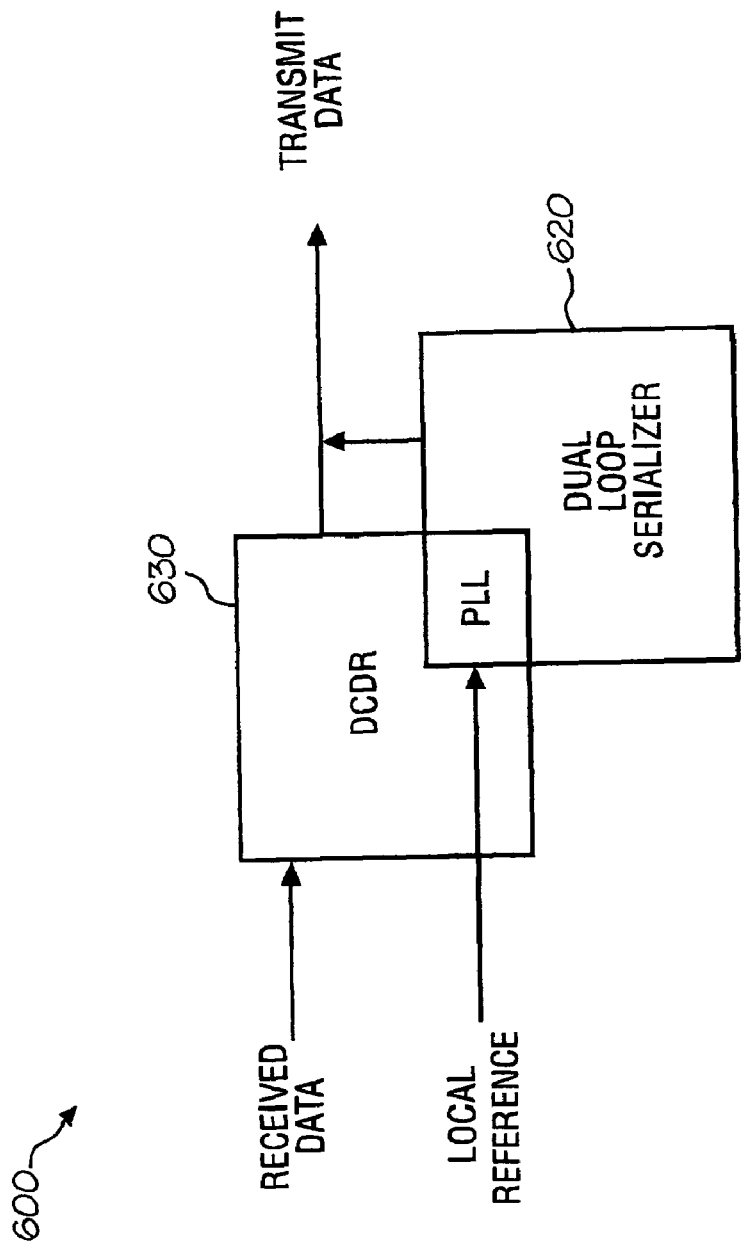
FIGS. 6 and 7 illustrate, in block format, dual loop retimers in accordance with various embodiments of the invention.

FIG. 6 illustrates, in block format, a dual loop retimer system 600 in accordance with another embodiment of the invention. In general, a retimer system recovers the clock from the received input data and retransmits the data with a clean output clock. Although not illustrated in the present figure, retimers basically include a clock recovery deserializer followed by a serializer.

Figure 1:
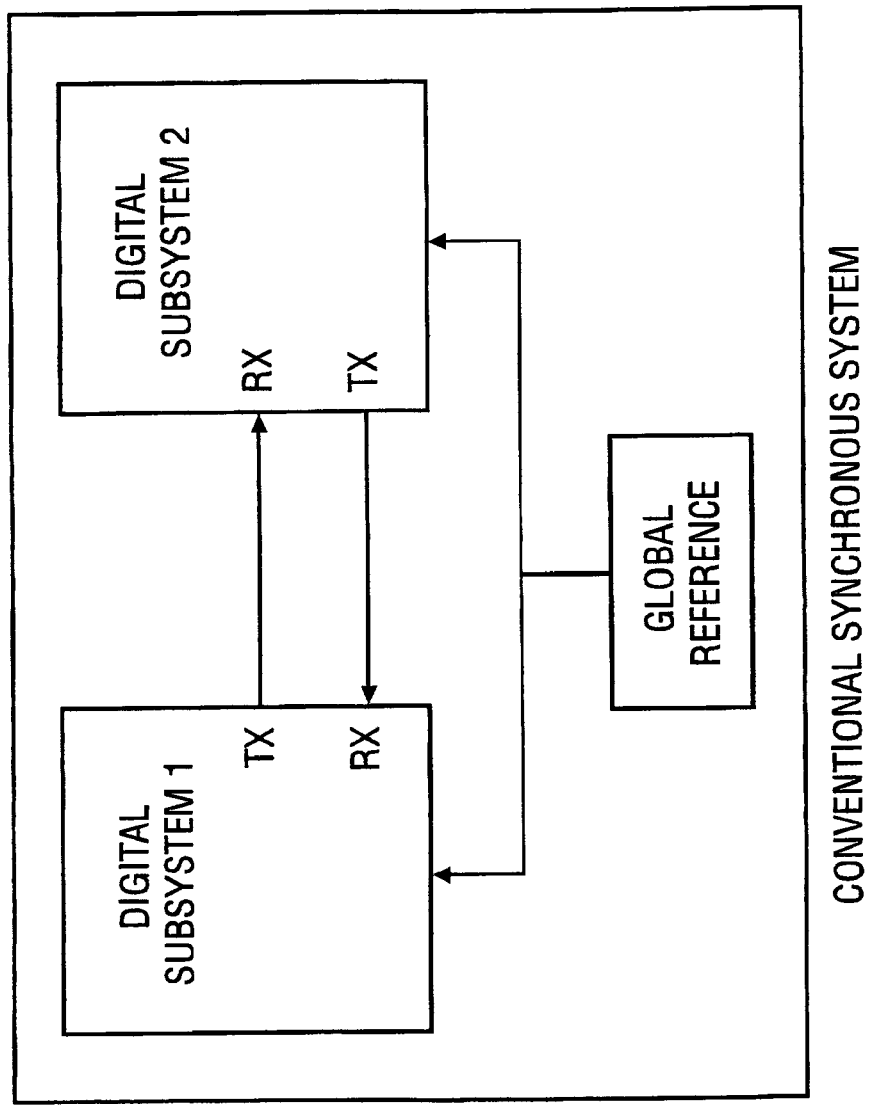
FIG. 1 illustrates, in block format, a conventional synchronous system architecture.
Figure 2:
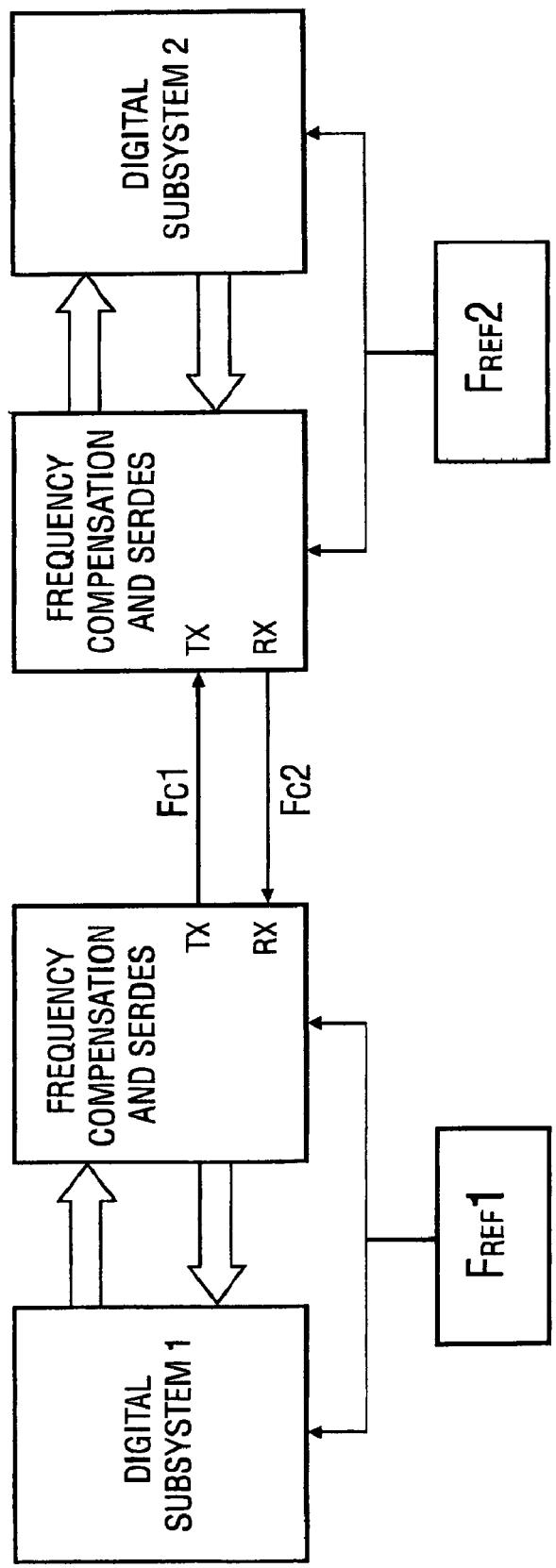
FIG. 2 illustrates, in block format, a conventional plesiochronous system architecture.
Figure 3:
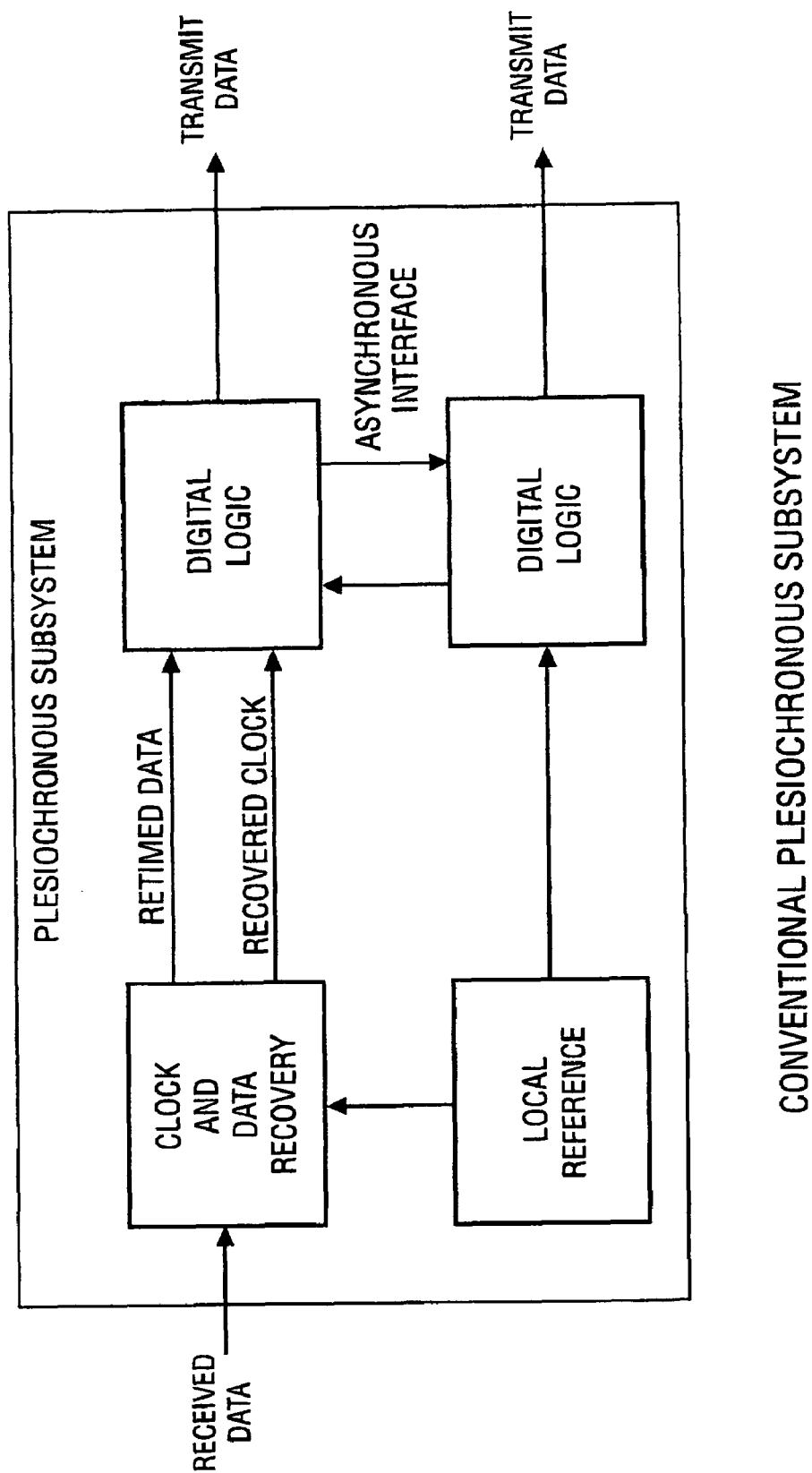
FIG. 3 illustrates, in block format, a conventional plesiochronous subsystem.
Figure 4:
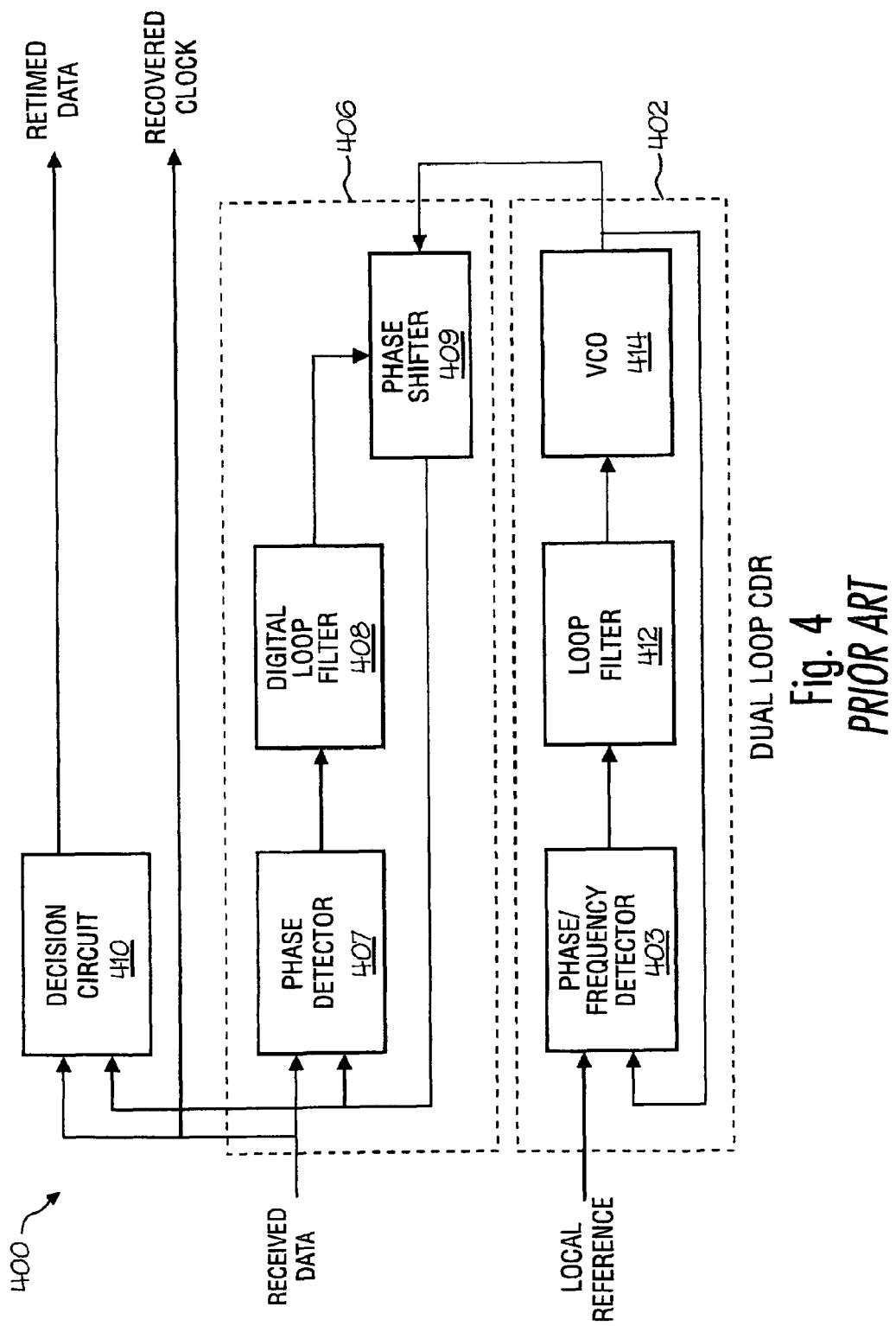
FIG. 4 illustrates, in block format, a dual loop CDR of the prior art.

In this particular embodiment, retimer 600 is implemented as a combination of a dual loop serializer 620 (e.g., serializer 500) and digital clock and data recovery (DCDR) 630 (e.g., CDR 400). Individually, serializer 620 and DCDR 630 may each include a PLL; however, when combined, a retimer in accordance with an exemplary embodiment of the invention may use a single analog PLL to generate the transmit clock. However, in other embodiments, multiple PLLs may be used. The DLL of serializer 620 provides frequency compensation and phase alignment to the data as in serializer 500 of FIG. 5. The clock recovery of retimer 600 is slaved off the PLL, and provided by a second DLL, as in the plesiochronous CDR 400 of FIG. 4.

Figure 7:
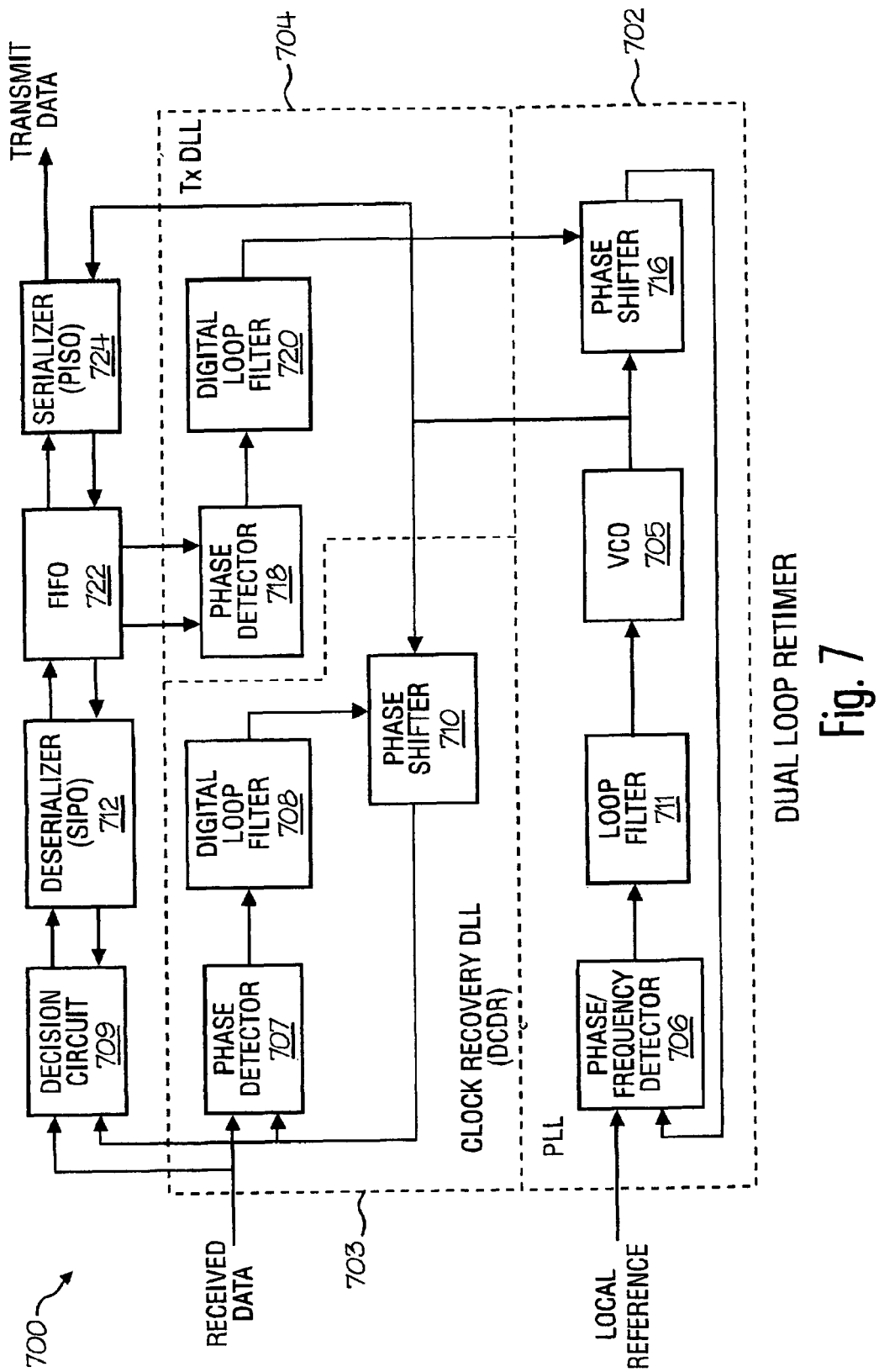

Referring now to FIG. 7, a exemplary block diagram of the retimer of FIG. 6 is illustrated. Retimer 700 includes a dual loop serializer, comprising PLL 702 and DLL 704, and a DCDR, comprising DLL 703 and PLL 702. As previously discussed, in accordance with an exemplary embodiment of the invention, a single analog PLL 702 is used which includes a phase shifter. Analog PLL 702 provides a reference frequency multiplication or, creates a serial clock that is close to a multiple of the target frequency. Similar to PLL 502 of serializer 500, PLL 702 includes a PFD 706, a loop filter 711, a VCO 705, and a phase shifter 716.

Digital DLL 703 provides clock recovery in much the same manner as CDR 400 and similarly includes a phase detector 707, a digital loop filter 708, and a phase shifter 710. DLL 703 tracks the frequency offset in the plesiochronous system. Additionally, loop filter 708 of DLL 703 may be set as a wideband filter to track the input jitter and provide high jitter tolerance.

DLL 704 forms the DLL portion of serializer 500. As such, DLL 704 includes a phase detector 718 and a digital loop filter 720. Digital loop filter 720 may use digital integration to drive phase shifter 716 of PLL 702. In addition, loop filter 720 of DLL 704 may be a narrowband filter to provide jitter filtering.

Retimer 700 further includes a decision circuit 709, a deserializer 712, a FIFO 722, and a serializer 724. Deserializer 712 is a serial-in parallel-out (SIPO) element. In other words, deserializer 712 receives a serial data stream, then converts and reassembles the serial data back into a parallel data byte, which is referenced to the clock. Decision circuit 709 allows detection of small amplitude signals and regenerates the signals to normal amplitude by reclocking the input with a high speed comparator. FIFO 722 and serializer 724 may be configured similar to previously described FIFO 522 and serializer 524.

In one particular embodiment, a dual loop retimer may include the elements as previously described for retimer 700, except deserializer 712 and serializer 724 may be omitted. In this embodiment, data may be written to the FIFO serially and the retimed data is read directly out of the FIFO.

Dual loop dual DLL retimer 700 offers significant advantages over traditional single loop and dual loop retimers. Unlike single loop retimers, the jitter transfer of the received data of retimer 700 is independently set from the jitter tolerance of the received data. This is because the jitter tolerance is set by the clock and data recovery DLL (DCDR) bandwidth (i.e., wide bandwidth) and the jitter transfer is set by the serializer DLL bandwidth (i.e., narrow bandwidth). Unlike conventional dual loop retimers, which may use multiple PLLs, retimer 700 may be implemented with a single analog PLL; thereby, simplifying the system and eliminating additional analog components. Furthermore, the combined DCDR and DLL function as cascaded DLLs rather than cascaded PLLs. Their filter responses generate a jitter transfer function that is a low pass transfer function with little or no jitter peaking. Thus, the retimer resets the jitter budget in such a way that an infinite number of repeater stages may be cascaded while still meeting the transmission requirement.

It should be appreciated that the particular implementations shown and described herein are illustrative of various embodiments of the invention including its best mode, and are not intended to limit the scope of the present invention in any way. Indeed, for the sake of brevity, conventional techniques for signal processing, data transmission, signaling, and network control, and other functional aspects of the systems (and components of the individual operating components of the systems) may not be described in detail herein. In addition, various of the operational and processing steps may be configured in different orders, and/or modified or deleted in accordance with various embodiments of the present invention. Furthermore, the connecting lines shown in the various figures contained herein are intended to represent exemplary functional relationships and/or physical couplings between the various elements. It should be noted that many alternative or additional functional relationships or physical connections may be present in a practical data synchronization system.

The invention has been described above with reference to exemplary embodiments. However, those skilled in the art having read this disclosure will recognize that changes and modifications may be made to the embodiments without departing from the scope of the present invention. These and other changes or modifications are intended to be included within the scope of the present invention, as expressed in the following claims.

The invention claimed is:

1. A method of synchronizing data in a plesiochronous system, comprising:
   receiving an input data and a data clock;
   writing the input data to a first-in-first out register (FIFO);
   monitoring a fill level of the FIFO;
   generating a signal by a phase locked loop (PLL) in relation to a phase of a reference signal input to the PLL;
   generating a transmit clock by adjusting the phase of the signal generated by the PLL according to the fill level of the FIFO so that a change in the fill level of the FIFO corresponds to a frequency offset in the signal generated by the PLL relative to the phase of reference signal input to the PLL; and
   outputting the input data from the FIFO according to the transmit clock.

2. A method of synchronizing data in a plesiochronous system according to claim 1, wherein monitoring the fill level of the FIFO comprises monitoring the fill level of the FIFO in a delay-locked loop (DLL).

3. A method of synchronizing data in a plesiochronous system according to claim 2, wherein monitoring the fill level of the FIFO in the delay-locked loop comprises reading the fill level of the FIFO using a phase detector.

4. A method of synchronizing data in a plesiochronous system according to claim 3, further compromising filtering output of the phase detector with a narrow bandwidth filter adapted to reduce a noise present in a data clock.

5. A method of synchronizing data in a plesiochronous system according to claim 1, wherein generating the transmit clock comprises:
   detecting a phase and a frequency of the reference signal input to the PLL in a phase frequency detector of the PLL;
   synthesizing the signal generated by the PLL using a voltage controlled oscillator (VCO) of the PLL;
   phase shifting the signal generated by the PLL according to the fill level of the FIFO; and
   providing feedback to the phase frequency detector corresponding to the phase shifting imparted on the signal generated by the PLL.

6. A method of synchronizing data in a plesiochronous system according to claim 5, wherein the PLL is adapted to filter a phase noise generated by the VCO.

7. A method of synchronizing data in a plesiochronous system according to claim 1, wherein writing the input data to a first-in-first-out register (FIFO) comprises writing the input data to the FIFO according to the data clock.

8. A method of synchronizing data in a plesiochronous system according to claim 7, wherein writing the input data to the FIFO according to the data clock comprises recovering the data clock from the input data.

9. A method of synchronizing data in a plesiochronous system according to claim 8, wherein recovering the data clock from the input data comprises:
   detecting a local reference;
   generating an oscillating signal at a frequency proportional to the local reference;
   receiving the input data at a phase detector;
   reconstructing the data clock, comprising shifting the phase of the oscillating signal according to the input data; and
   outputting the data clock.

10. A method of synchronizing data in plesiochronous system according to claim 9, further comprising filtering the output of the phase detector with a wideband filter adapted to remove input jitter.

11. A method of synchronizing data in a plesiochronous system according to claim 1, wherein the phase of the signal generated by the PLL is adjusted so that the fill level of the FIFO remains nearly constant.

12. A method of synchronizing data in a plesiochronous system according to claim 1, further comprising phase-locking an output of a voltage controller oscillator (VCO) of the PLL to the data clock with a narrowband loop set by a bandwidth of a delay locked loop (DLL).

13. A method of synchronizing data in a plesiochronous system according to claim 12, wherein the VCO is phase-locked to the reference signal input to the PLL outside of the bandwidth of the DLL.

* * * * *